Feb. 6, 1968    A. EISELE    3,367,033
PROTECTED RETRACTIBLE FEELER BORE CONCENTRICITY GAUGE
Filed April 20, 1966    2 Sheets-Sheet 1

INVENTOR
ANDREW EISELE

Barthel & Bugbee
ATTORNEYS

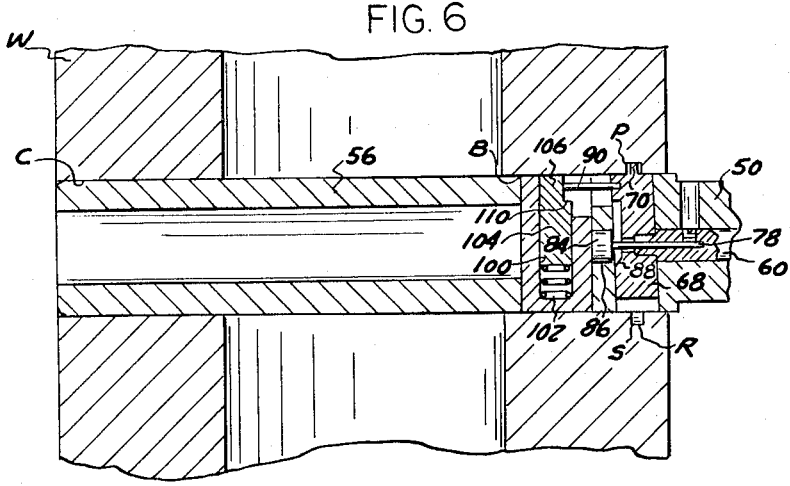
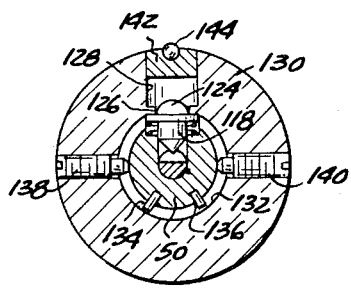
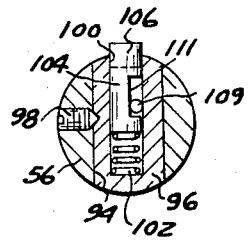
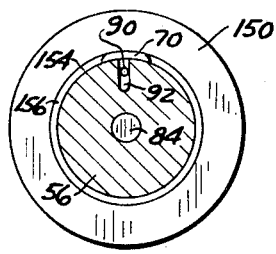
INVENTOR
ANDREW EISELE
BY Barthel & Bugbee
ATTORNEYS

United States Patent Office 3,367,033
Patented Feb. 6, 1968

3,367,033
PROTECTED RETRACTIBLE FEELER BORE
CONCENTRICITY GAUGE
Andrew Eisele, 20460 Brookwood,
Dearborn Heights, Mich. 48127
Filed Apr. 20, 1966, Ser. No. 543,937
10 Claims. (Cl. 33—174)

This invention relates to bore gauges and, in particular, to bore concentricity gauges. Its objects include the provision of a bore concentricity gauge which is adapted to measure the concentricity and/or depth of a recess located away from the entrance of a bore with an obstacle therebetween; also a protective device for preventing injury to the measuring pin or feeler by the inadvertent insertion of the bore gauge into the bore without first retracting the measuring pin; also of a built-in dial indicator zero-setting gauge by which the zero mark of the dial indicator may be precisely set without recourse to any external gauge; and further a measuring pin retracting device which is also built into the instrument and which forcibly retracts the measuring pin in response to the rotation by the operator of a sleeve on the gauge.

Hitherto, the measurement of concentricity of bores has been attended with difficulty where the mouth of the bore was of reduced diameter so that it presented an obstacle to the insertion of the forward end of the bore gauge containing the measuring pin or feeler. Damage to the measuring pin often occurred as a result of the inadvertent or careless insertion of the bore gauge without carefully retracting the measuring pin, as by pushing it into the stem of the bore gauge while inserting the stem into the mouth of the bore. Previously, it has also been necessary to set the zero mark of the dial indicator of the bore gauge by reference to a separate ring or sleeve gauge which is not always conveniently at hand. The present invention overcomes these defects of prior bore gauges by providing a measuring pin retracting mechanism operated by a rotary sleeve which at the same time retracts a safety pin located in front of the measuring pin and which normally protects the measuring pin by preventing insertion of the bore gauge stem or pilot portion thereof into the bore gauge without first retracting both the safety pin and the measuring pin or feeler. The present invention also provides a built-in, zero-setting, axially-slidable sleeve or ring gauge by which the needle of the dial indicator used with the bore gauge is brought to rest at the proper zero location and the zero mark of the graduated dial then rotated by the operator to register with the needle.

Other objects and advantages of the invention will become apparent during the course of the following description of the accompanying drawings, wherein:

FIGURE 3 is a cross-section through the safety pin and measuring pin retracting mechanism taken along the line 3—3 in FIGURE 2;

FIGURE 4 is a cross-section through the bore gauge stem at the location of the safety pin;

Figure 2:
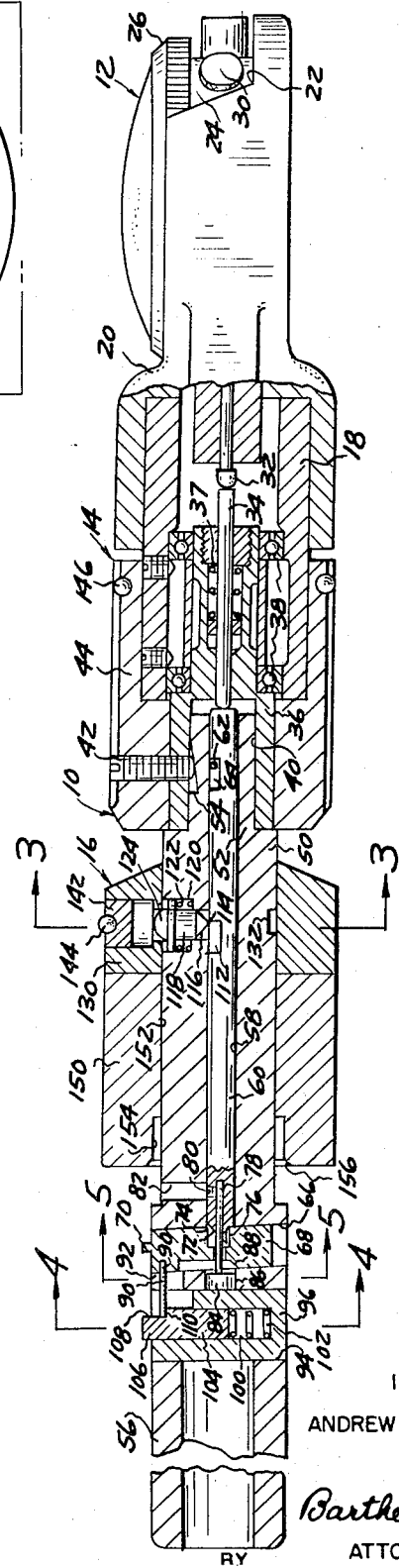
FIGURE 2 is a central vertical section, partly in side elevation, taken along the line 2—2 in FIGURE 1, with the safety pin and measuring pin extended.

FIGURE 5 is a cross-section taken along the line 5—5 in FIGURE 2, in a plane approximately midway between the safety pin and measuring pin; and FIGURE 6 is a fragmentary central vertical section similar to FIGURE 2, of the forward portion of the gauge inserted in a bore with the safety pin retracted and with the measuring pin or feeler extended into measuring engagement with an internal recess for measurement of its depth and/or concentricity.

Figure 1:
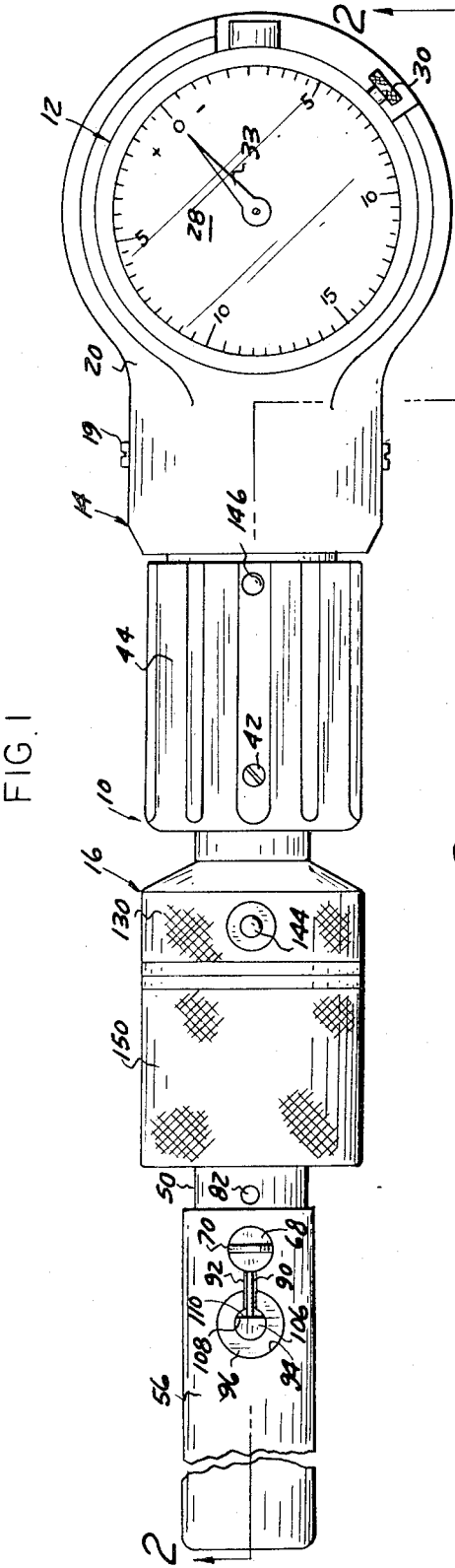
FIGURE 1 is a top plan view of a protected bore concentricity and recess depth gauge, according to one form of the invention.

Referring to the drawings in detail, FIGURES 1 and 2 show a protected bore concentricity and recess depth gauge, generally designated 10, according to one form of the invention as including generally a dial indicator 12 within a dial indicator holder 14 adapted also to receive and hold the bore concentricity and recess depth gauge attachment 16 of the present invention. The dial indicator 12 is conventional and the dial indicator holder 14 is also beyond the scope of the present invention and is disclosed and claimed in the Eisele Patent 2,956,342 issued Oct. 18, 1960 for Precision Concentricity Gauge.

Briefly described, the dial indicator holder 14 (FIGURES 1 and 2) consists of a rearward tubular member 18 to which is secured as by the set screw 19 the counterbored forward end portion of a dial indicator support or stationary handle 20 having a cup-shaped socket 22 receiving the casing 24 of the dial indicator 12, the bezel or rim 26 of which is rotatably mounted thereon and which carries the graduated dial 28 thereof and is locked in position by a clamping screw 30. The dial indicator 12 has the usual reciprocable plunger 32 which actuates the dial indicator needle 33 through the conventional mechanism thereof (not shown). The dial indicator plunger 32 is engaged by a reciprocable rearward motion-transmitting rod 34 mounted in a forward tubular member 36 and urged forwardly by a compression spring 37. Arranged between the tubular members 36 and 18 are axially-spaced ball bearings 38 for facilitating precise relative rotation therebetween. The enlarged forward end of the forward tubular member 36 is provided with a counterbore or socket 40 and also is drilled and threaded transversely to receive a set screw 42 which also passes through the correspondingly drilled forward end portion of a counterbored fluted tubular barrel or rotary handle 44 to rotate unitarily with the forward utbular member 36 relatively to the rearward tubular member 18 and the dial indicator receiver 20 mounted thereon and secured thereto by the set screw 19.

The bore concentricity and recess depth gauge attachment 16 includes a tubular stem 50 with a reduced diameter rearward end portion 52 adapted to snugly fit the counterbore 40 in the forward tubular member 36 and be removably clamped therein by the set screw 42, which engages an inclined notch 54 in the portion 52. The tubular stem 50 has a slightly enlarged diameter forward pilot portion 56 of such diameter as to slidably fit the bores B and C in the workpiece W (FIGURE 6) while the recess R in the bore B is being measured for concentricity and/or depth.

The tubular stem 50 is provided with a central bore 58 coaxial with the rearward motion-transmitting rod 34 and containing a forward motion-transmitting rod 60 slidably mounted therein and engageable at its rearward end with the forward end of the rearward motion-transmitting rod 34. The reduced diameter portion 52 of the stem 50 is drilled chordally of the forward motion-transmitting rod 60 to receive a rotation-preventing transverse pin 62 slidably engageable with a flat-bottomed notch 64 therein.

The forward end of the longitudinal bore 58 projects into a transverse bore 66 in the enlarged diameter or pilot portion 56 near the rearward end thereof, the transverse bore 66 being inclined slightly forward to the axis of the longitudinal bore 58 in order to facilitate the initial sliding motion of a measuring pin or feeler 68 equipped with an arcuate measuring or feeler tip portion 70. An inclination of about 3 degrees has been found satisfactory for this purpose.

The forward end portion 72 of the forward motion-transmitting rod 60 is inclined at an angle of approximately 45 degrees thereto and projects into the transverse bore 66 into engagement with the sharp edge 74 of a rectangular notch 76 in such a manner as to cause the forward motion-transmitting rod 60 to move rearwardly along the bore 58 when the measuring pin or feeler 68 is pushed downward in its bore 66 by the engagement of its arcuate feeler portion 70 with the surface S (FIGURE 6) of the recess R to be measured. The forward end portion of the forward motion-transmitting rod 60 is bored longitudinally and the approximate midportion of the measuring pin 68 slotted adjacent the notch 76 for the reception and passage of a headed feeler-retraction pin 78. The forward portion of the forward motion-transmitting rod 60 is bored and threaded transversely to receive a locking screw 80 engaging and locking in position the pin 78 and is reached through a transverse access hole 82.

The head 84 of the pin 78 is reciprocably mounted in a short axial bore 86 which is coaxial with the bore 58. The rearward edge of the head 84 slidably engages the inclined lower end surface 88 of an elongated notch in the forward side wall of the measuring pin or feeler 68 opposite the notch 76 in the rearward side wall thereof, so that when the rod 60 moves the pin 78 rearwardly, the head 84 thereof pushes against the inclined surface 88 to retract the feeler portion 70 of the measuring pin 68 within the transverse bore 66.

Near its upper end and adjacent the feeler portion 70, the measuring pin 68 is drilled parallel to the axis of the bore 58 to receive the rearward end of a retraction pin 90 (FIGURE 2) with a press fit. The retraction pin 90 passes through a slot 92 in the wall portion between the inclined bore 66 and a transverse bore 94 in which a cup-shaped plug 96 is mounted. The forward end portion 56 of the stem 50 is drilled and threaded to receive a set screw 98 by which the plug 96 is locked in position (FIGURE 4). The plug 96 is provided with a lined or cup-shaped bore 100, the lower end of which receives a compression spring 102 which engages the inner end of a feeler protective pin 104, the upper end portion 106 of which projects beyond the upper end of the plug 96 and is notched or rabbeted at 108 along its rearward side to provide a shoulder 110 for engagement by the forward end of the retraction pin 90. Consequently, when the feeler or measuring pin 68 is retracted into the stem portion 56 by the rearward motion of the forward motion-transmitting rod 60, as explained below, the pin 90 acting against the shoulder 110 also retracts into the socket 100 the feeler protective pin 104. The plug 96 is drilled chordally across the socket 100 to receive a pin 109 which engages the bottom surface of a flat-bottomed recess 111 (FIGURE 4) to prevent rotation of the pin 104.

In order to move the forward motion-transmitting rod 60 rearwardly, it is provided intermediate its opposite ends with a cutaway portion 112, the rearward edge 114 of which is engageable with the conical lower end 116 of a flanged short plunger 118 reciprocably mounted in a counterbored transverse hole 120 (FIGURES 2 and 3). The plunger 118 is urged upward or outward by a compression spring 122 mounted in the hole 120 beneath the flange and its rounded upper end 124 is engaged by the annular edge 126 of a counterbored radial hole 128 (FIGURE 3) in a rotary collar 130, such rotation causing the edge 126 to press upon the rounded end 124 so as to depress the plunger 118, the conical inner end 116 of which engages and pushes against the rearward edge 114 of the recess 112 to forcible move the forward motion-transmitting rod 60 rearwardly and with it the headed pin 84, thereby retracting the pins 68 and 104 into the forward stem portion 56.

The stem 50 in the plane of the pointed end of the plunger 118 is provided with an arcuate circumferential groove 132 (FIGURES 2 and 3) and is also drilled radially at circumferentially-spaced locations to receive a pair of stop pins 134 and 136 pressed firmly therein and projecting into the arcuate groove 132. The collar 130 is drilled and threaded radially at circumferentially-spaced locations from the pins 134 and 136 to receive headless stop screws 138 and 140 (FIGURE 3), the reduced diameter ends of which project into the arcuate groove 132 so as to engage the stop pins 134 and 136 and thereby limit the rotation of the collar 130. The upper or outer end of the counterbored hole 128 is closed by a plug 142 containing an index bead 144 which indicates the position of rotation of the collar 130 relatively to a similar bead 146 similarly set into the barrel 44, in order to determine the condition of the safety pin 104 and measuring pin 68, whether extended or retracted, when these are concealed within the bore B and recess R to be measured. The collar 130 is preferably knurled or otherwise roughened in order to prevent slippage when grasped by the operator.

Slidably mounted upon the stem 50 forwardly of the rotary collar 130 is a zero-setting sleeve gauge 150 having an axial bore 152 snugly but slidably receiving and engaging the stem 50 and having at its forward end a gauging counterbore 154 which is the exact diameter which the feeler portion 70 of the measuring pin 68 is intended to indicate upon the dial indicator dial 28 as its zero position. The forward or outer end of the counterbore 154 is flared as at 156 to facilitate entry of the feeler portion 70 when the sleeve gauge 150 is slid forward along the stem 50 for the zero setting operation, as explained below.

Prior to the operation of the gauge 10, it will be understood that a measuring attachment 16 of the proper diameter of pilot portion 56 is attached to the dial indicator holder 14 by inserting its reduced diameter rear end portion 52 into the socket 40 and locking it in position by the set screw 42. It will be understood that the attachment 16 is preferably made separable from the dial indicator holder 14 in order to adapt it to the measurement of different sizes of bores B by the provision of different diameters of pilot portions 56. The dial locking screw 30 of the dial indicator 12 is loosened and the zero setting sleeve gauge 150 is moved forward axially along the stem 50 until the flared portion 156 of its counterbore 154 passes over and thereby depresses the feeler portion 70 of the measuring pin 68 and forces it downward into the enlarged portion or pilot portion 56 of the stem 50. With the measuring pin 68 thus depressed and its feeler portion 70 engaging the counterbore 154, the operator rotates the rim or bezel 26 and graduated dial 28 by his fingers until the zero mark thereon coincides with the tip of the dial indicator needle 33. The operator then rotates the clamping screw 30 to lock the dial 28 in its zero-adjusted position and slides the zero setting sleeve gauge 150 rearwardly along the stem 50 to move the counterbore 154 out of engagement with the feeler portion 70 of the measuring pin 68, releasing the latter for motion outward into the position shown in FIGURE 2 in response to the thrust of the spring 37.

The operator now grasps the barrel 44 with one hand and the collar 130 in the other hand and rotates the collar 130 relatively to the barrel 44 in either direction or rotation. This action moves the forward bead 144 out of alignment with the rearward bead 146 and at the same time causes the edge 126 (FIGURE 3) of the counterbored hole 128 to ride up over the spherical upper end 124 of the plunger 118, forcing the latter downward or inward. The rotation of the collar 130 is halted by the engagement of the stop screw 138 or 140 with its respective stop pin 134 or 136. The inward motion of the conical tip 116 of the plunger 118 (FIGURE 2) engages and pushes the rearward end edge 114 of the cutaway portion 112 rearwardly, causing the forward motion-transmitting rod 60 to move rearwardly, carrying with it the beaded pin 78. This action causes the rearward edge of the head 84 of the pin 78 to engage the inclined surface 88 in the longitudinal notch 90 of the measuring pin or feeler 68 with a cam action which moves the measuring pin 68 downward into the pilot portion 56 of the stem 50. The consequent downward motion of the retraction pin 90 against the shoulder 110 on the safety pin 104 moves the pin 104 downward into its socket 100 against the thrust of the compression spring 102, thereby withdrawing its outer end portion 106 into the plug 96 and therefore into the pilot portion 56 of the stem 50, since the ends of the plug 96 are flush with the pilot portion 56.

The operator is now able to push the pilot portion 56 into and through the forward bore B in the workpiece W into the bore C thereof (FIGURE 6), until the feeler portion 70 of the measuring pin 68 arrives in registry with the groove or recess R, the bottom surface S of which is to be measured for concentricity and the recess R, if desired, for depth. The operator then rotates the retraction collar 130 in the reverse direction so that the bead 144 realigns axially with the bead 146 (FIGURE 1), whereupon the spring 122 urges the plunger 118 (FIGURE 2) upward out of engagement with the edge 114 of the cutaway portion 112 in the forward motion-transmitting rod 60. The spring 37 then urges the rearward motion-transmitting rod 34 and forward motion-transmitting rod 60 in a forward direction, causing the inclined end surface 72, acting against the notch edge 74, to push the measuring pin 68 outward, so that the feeler portion 70 comes into engagement with the bottom surface S of the arcuate or annular recess or groove R (FIGURE 6). The reading of the needle 33 upon the graduated dial 28 of the dial indicator 12 then indicates the depth of the recess R.

To measure the concentricity of the bottom surface S of the arcuate recess R relatively to the workpiece bore B (FIGURE 6), the operator now grasps the dial indicator holder 14 in one hand and the fluted barrel 44 in the other hand, rotating the barrel 44 relatively to the dial indicator holder 14. This action causes the stem 50 to rotate, which in turn causes the feeler portion 70 of the measuring pin 68 to sweep along the bottom surface S of the recess R. If the bottom surface S is concentric or coaxial with the bore B, the dial indicator needle 33 remains stationary during this action. If, however, eccentricity exists, the extent of this will be indicated by the motion of the needle 33 relatively to the graduated dial indicator scale 28.

Having completed his measurement, the operator again rotates the collar 130 relatively to the barrel 44 to retract the feeler end 70 into the pilot portion 56 of the stem 50 in the manner described above. He then withdraws the stem 50 of the bore concentricity and recess depth gauge unit 16 from the workpiece W without damage to the feeler portion 70. He finally rotates the collar 130 again in the reverse direction to release the measuring pin 68 and safety pin 104, the latter preventing reinsertion of the stem 50 into a bore B until the feeler portion 70 of the measuring pin 68 and safety pin 104 have again been retracted in the manner described above.

The workpiece W is shown in the form of a tubular member with its side wall bored at diametrically opposite locations aligned with one another so that the bores B and C are coaxial as, for example, the wrist pin bores of a piston of an internal combustion engine. In the arrangement shown (FIGURE 6), it is evident that the safety pin 106 protects the feeler portion 70 of the measuring pin 68 from damage only during the insertion thereof in the bore B and not during withdrawal. It is assumed that the workman, having been warned by the projecting safety pin 106 that the outwardly-projecting safety pin 106 prevents insertion of the pilot portion 56 as far as the feeler portion 70 until the retraction mechanism 16 is operated by rotating the collar 130, will again operate the retraction mechanism 16 before attempting to withdraw the instrument from the bore B. If, however, it is desired to protect the feeler portion 70 during withdrawal as well as during insertion, it will be evident from FIGURE 6 that the bore 100 must be positioned inward a greater distance in the forward portion 56 of the stem 50 so that its end portion projects into the open space between the opposite bores B and C and will engage the side wall of the workpiece W internally unless it is positively retracted by the operator. In the example shown in FIGURE 6, therefore, the bore 100 would be moved to the left until the safety pin portion 106 was located beneath the reference letter B.

What I claim is:

1. The combination with a dial indicator holder including a stationary handle structure having a dial indicator thereon and a rotary handle structure rotatably connected to said stationary handle structure, of
    an elongated hollow stem connected in coaxial relationship to said rotary handle structure for rotation thereby and having an external reference surface thereon adapted to fit a concentricity reference bore,
        said stem having a longitudinal bore therein coaxial with the axis of rotation of said handle structure and a first transverse bore disposed remote from said handle structure in communication with said logitudinal bore,
    a transversely-reciprocable measuring member reciprocably mounted in said first transverse bore and having a workpiece bore-contacting feeler portion operatively connected thereto,
    motion-transmitting mechanism extending from said measuring member through said stem and handle structures to the dial indicator and responsive to the transverse shifting of said measuring member by the engagement of said feeler portion,
    and a dial indicator zero-setting gauge having a zero-setting surface thereon of a radius from the axis of said stem equal to the zero position radius on the dial of the dial indicator and movably connected to said stem for travel selectively into and out of engagement with said measuring member feeler portion.

2. The combination of claim 1, wherein said zero-setting gauge comprises a hollow member slidably mounted on said stem and out of said feeler portion engagement.

3. The combination of claim 2, wherein said zero-setting surface is of circularly-arcuate cross-section with its axis coincident with the axis of said stem.

4. The combination of claim 2, wherein said zero-setting surface is a cylindrical surface with its axis coincident with the axis of said stem.

5. The combination with a dial indicator holder including a stationary handle structure having a dial indicator thereon and a rotary handle structure rotatably connected to said stationary handle structure of
    an elongated hollow stem connected in coaxial relationship to said rotary handle structure for rotation thereby and having an external reference surface thereon adapted to fit a concentricity reference bore,
        said stem having a longitudinal bore therein coaxial with the axis of rotation of said handle structure and a first transverse bore disposed remote from said handle structure in communication with said longitudinal bore,
    a transversely-reciprocable measuring member reciprocably mounted in said first transverse bore and having a workpiece bore-contacting feeler portion operatively connected thereto,
    motion-transmitting mechanism extending from said measuring member through said stem and handle structures to the dial indicator and responsive to the transverse shifting of said measuring member by the engagement of said feeler portion,
        said measuring member having a retraction portion thereon inclined relatively to the axis of said stem and said motion-transmitting mechanism including a reciprocable member having a retraction-effecting portion thereon operatively connected to said reciprocable member and engageable with said retraction portion, and means for selectively moving said reciprocable member in a retraction-effecting direction.

6. The combination of claim 5 wherein said retraction portion includes a retraction surface on said measuring member inclined relatively to the axis of said reciprocable member.

7. The combination of claim 6, wherein said measuring member has a cutaway portion therethrough, and wherein said retraction-effecting portion includes an element connected to said reciprocable member and extending through said cutaway portion into operative engagement with said retraction surface.

8. The combination of claim 5, wherein said selectively moving means includes a retraction element engageable with said reciprocable member and movable substantially and right angles thereto, and a rotary retraction device rotatably mounted on said stem and having a portion thereon movable into and out of depressing engagement with said retraction element in response to rotation of said retraction device.

9. The combination of claim 5, wherein said stem has a second transverse bore disposed forwardly out of said first transverse bore in longitudinally-spaced relationship therewith, wherein a safety member is reciprocably mounted in said second transverse bore for motion into and out of projecting relationship with said stem, wherein means is provided for urging said safety member into said projecting relationship, and wherein safety member operating means connects said measuring member to said safety member and is responsive to the retraction of said measuring member for retracting said safety member.

10. The combination of claim 9, wherein said safety member operating means includes a safety member operating element connected to said measuring member and extending forwardly therefrom into operative engagement with said safety member.

References Cited

UNITED STATES PATENTS 2,883,755 4/1959 Lovenston.
3,216,121 11/1965 Eisele.

SAMUEL S. MATTHEWS, *Primary Examiner.*